United States Patent [19]

Silen

[11] 4,126,972

[45] Nov. 28, 1978

[54] TORNADO PROTECTION BUILDING

[76] Inventor: Almer Silen, 2510 Cheyenne St., Big Spring, Tex. 79720

[21] Appl. No.: 700,163

[22] Filed: Jun. 28, 1976

[51] Int. Cl.² .......................................... E04H 9/14
[52] U.S. Cl. ...................................... 52/34; 52/166; 52/167; 52/169.6; 52/173 R
[58] Field of Search .................. 109/1 S, 83, 85, 1 Y, 109/15; 52/294, 292, 169.6, 289

[56] References Cited

U.S. PATENT DOCUMENTS

| | | | |
|---|---|---|---|
| 1,378,928 | 5/1921 | Witzel | 109/83 |
| 1,586,085 | 5/1926 | Hill | 52/169 |
| 1,706,496 | 3/1929 | Pieri | 52/167 |
| 3,216,163 | 11/1965 | Carew | 52/169 |
| 3,916,578 | 11/1975 | Forootan | 52/167 |

*Primary Examiner*—John E. Murtagh

[57] ABSTRACT

A tornado protection building, one of the rooms of which has a tornado protection assembly extending across the top and sides of its interior, the building having a concrete slab under it, into which the protection assembly is anchored, the protection assembly having a design providing much greater strength than sheet material so as to resist forces in all directions exerted by a tornado, the protection assembly protecting a first floor space which is but a small part of a basementless house.

12 Claims, 10 Drawing Figures

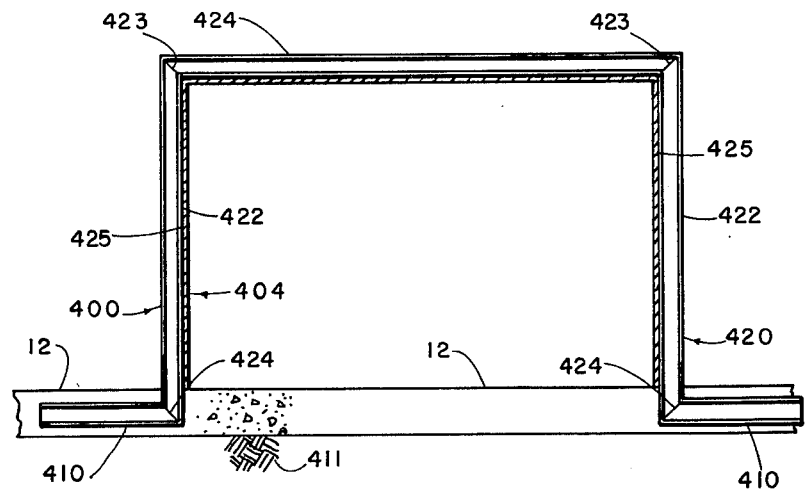
FIG. 5
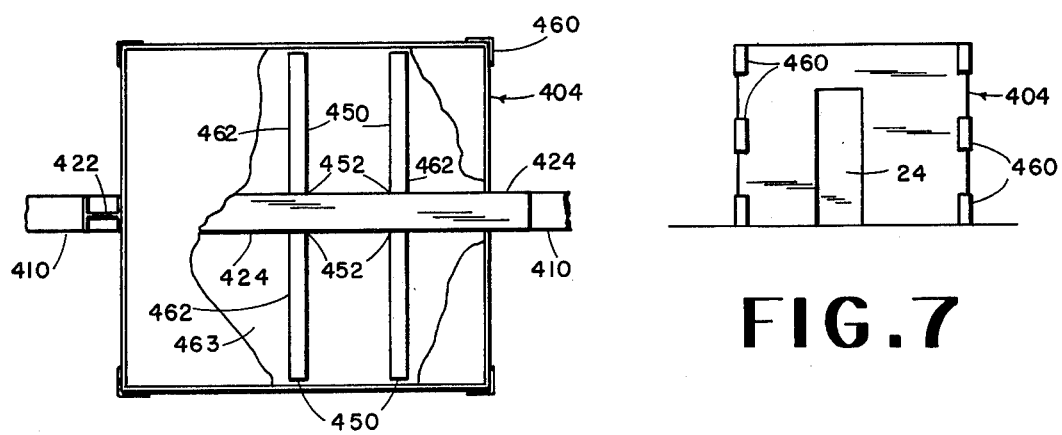
FIG. 6
FIG. 7
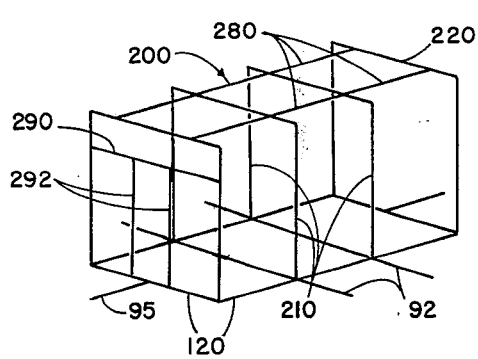
FIG. 9
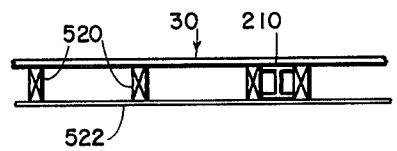
FIG. 8
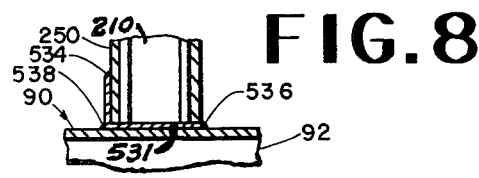
FIG. 10

TORNADO PROTECTION BUILDING

FIELD OF THE INVENTION

This invention is in the field of tornado shelters.

DESCRIPTION OF THE PRIOR ART

In many sections of the country houses and other buildings are built without basements and so there is no basement in which a family can seek shelter during a tornado. To my knowledge there has never been a tornado protection assembly built into a house in a concept such that a conventional one of the rooms of the house can be used as a tornado shelter. Any room can be used for this purpose, even closets. I prefer a bathroom, however, because, if the wait is long, complete facilities are available, and especially because a bathroom usually is of sufficient size, as compared to a closet, but is also not so large as to make the protection assembly expensive.

A particular objective is to provide a family with a tornado shelter within easy reach. Sometimes warning is only moments before a tornado hits. At such times a family does not have time to go to an outside underground tornado shelter, even if they had one. For example, if the only warning of a tornado is that one is heard then there would be no time in many cases to reach an outside underground tornado shelter, and even families who do have basements might find it impossible to reach their basement in time. To my knowledge no protection system has been offered on the public market that would eliminate or reduce the injuries and deaths of people in those vast tornado areas where there are no basements in buildings.

The specific problem solved herein is not primarily to tornado-protect people on basement level but on the first floor above the general level of ground around a basementless home.

SUMMARY OF THE INVENTION

A tornado protection assembly comprising an enclosure having top and side walls, each of said walls having substantial resistance to tornado forces that might be exerted on the wall in all directions as achieved by having either a sheet metal shell supported on the inner side by vertical and horizontal beams secured together in a framework structure or else having the same kind of a beam structure disposed on the outside of the shell, or other construction giving strength and which is generally describable under the description of saying that when the walls are considered to be the frame structure adjacent a sheet metal panel and the sheet metal panel itself together forming a wall, that the nature of each wall is that it has a space between an imaginary outer plane touching outermost portions of the respective wall and another imaginary inner plane touching innermost portions of the same respective side wall, the space being substantial, such as, at the least, one inch in dimension and preferably many inches so as to provide each respective wall with substantial resistance to forces that might be exerted by the tornado, is the major objective of this invention.

Another objective is to provide a tornado protection assembly as described which can simply be primarily flat sheet metal walls of such thickness as to have sufficient strength, although flat on outer and inner sides and without bracing.

A further objective is to provide a tornado protection assembly with anchor means on its lower side and fixed thereto and adapted to be buried under concrete, such as the concrete of a floor slab of a building.

Another objective is to provide a tornado protection building, one of the room of which has a tornado protection assembly such as described above, extending across the top and sides of its interior, the building being either a house or a commercial building, the building having a concrete or similar slab under it, into which latter the protection assembly is anchored.

An objective is to provide the protection assembly with such necessary openings as are needed for not interfering with the use of the room which it protects, such as a doorway opening and such as opening for a toilet vent pipe and at least one opening through which electrical wiring can extend.

BRIEF DESCRIPTION OF THE DRAWING

FIG. 5 is a side elevation of a modification of the tornado protection assembly of this invention, shown as mounted in a concrete floor slab laid on the ground, the view being taken with the forward half of the assembly removed whereby the shell is shown in cross section and illustrating that the concrete can also extend beneath the anchor assembly.

FIG. 6 is a top plan view of the modified protection assembly of FIG. 5 without the concrete being shown and with the major part of the top broken away showing portions of the interior. End portions of the anchor assembly members are also shown broken away for convenience of illustration.

FIG. 7 is a view showing the shell portion only of the protection assembly of FIG. 5 and showing how reinforcing angle iron corner members can be disposed interconnecting corners of side walls in vertically spaced positions.

FIG. 8 is a vertical section taken through a wall of the tornado protection assembly and showing how the bracing vertical I-beam can be disposed between wooden studs for receiving a wall covering attached to the stud. This studding method illustrates a way of having studs alongside the vertical exterior beams of the modification of FIG. 5, but also shows a way of having studs alongside the interior vertical bracing beams of the modification of FIGS. 1, 3 and 4.

FIG. 9 is a perspective view of a diagrammatic nature illustrating the general outline of a rigid bracing structure of the modification of FIGS. 1, 3 and 4 which forms a rigid bracing unit to which the anchor assembly is attached. The structure of FIG. 9 being of great strength itself independently of the steel shell of FIG. 1.

FIG. 10 is a view of the connection of the bracing beam to the anchor beam.

DESCRIPTION OF THE PREFERRED EMBODIMENT

Figure 2:
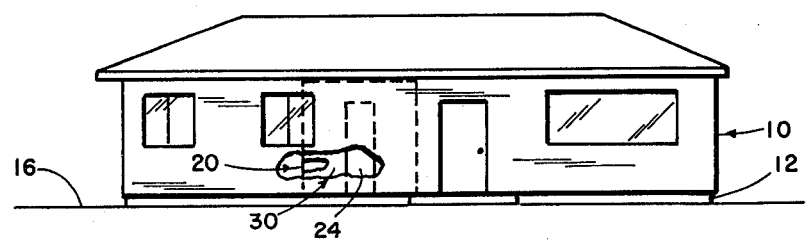
FIG. 2 is a tornado protection building, a house, the bathroom of which has a tornado protection assembly of this invention mounted therein and visible where the front wall of the house is broken away, the remainder of the assembly being shown in dotted lines.

As best seen in FIG. 2 a tornado protection building is there, generally indicated at 10, and can be either a house complete with bathroom and kitchen and other living rooms, or it can be a commerical building. The building 10 is basementless and is provided with a concrete slab 12 serving as a major portion of its foundation and the floor slab 12 is cast usually directly on the ground 16.

In FIG. 2 a portion of the side wall and such interior walls as are necessary is broken away for showing an interior room of the building, generally indicated at 20, and which can be, for example, a bathroom or any room of a building. It could also be a closet.

The interior room 20 is tornado-protected by this invention and the room 20 is specifically the house or building 10 on the first floor above the general level of ground around the basementless building or home 10.

In FIG. 2 a door 24 of a tornado protection assembly 30 of this invention can be seen.

Figure 1:
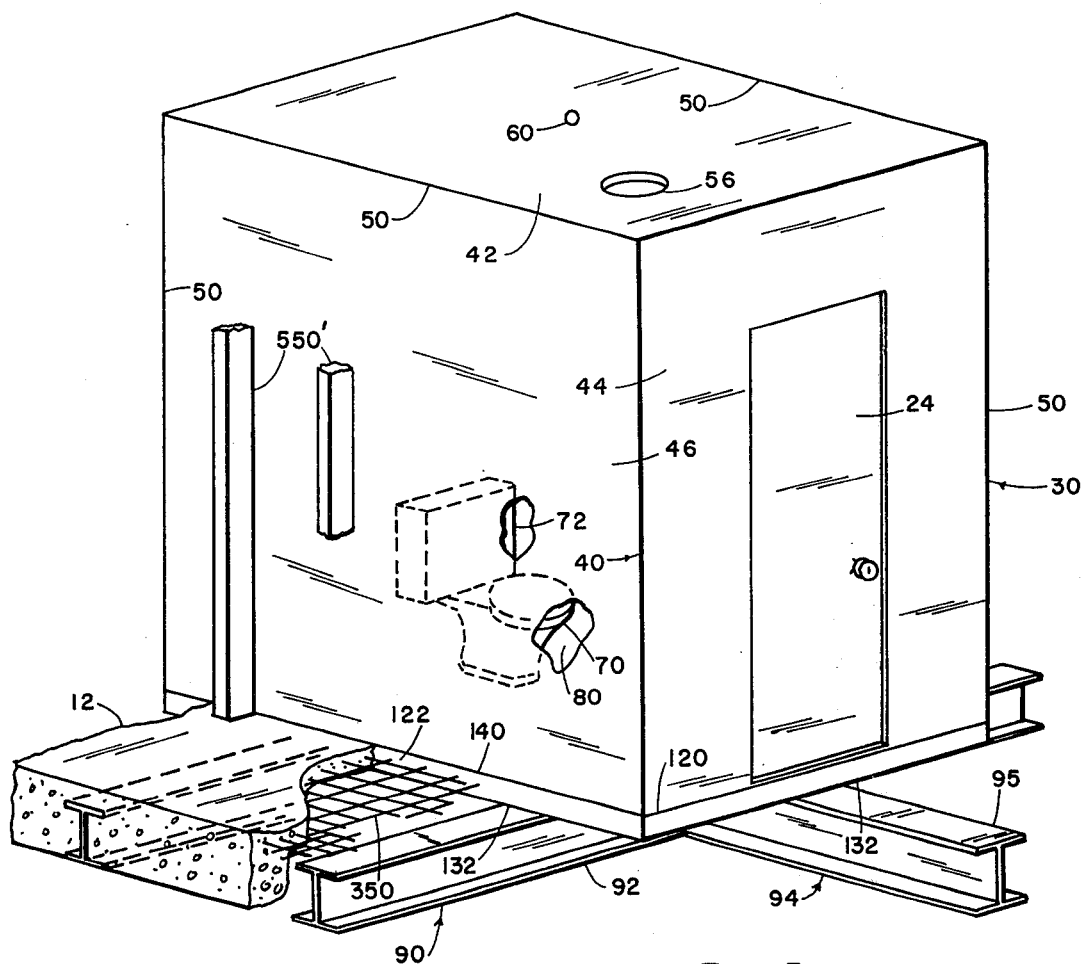
FIG. 1 is a perspective view of the tornado protection assembly of this invention shown with the beams of its anchoring assembly disposed with the concrete of a floor slab above them, portions of the floor and of the reinforcing wire mesh thereof being shown and the remainder thereof being broken away, symbolic sample exterior ribs or beams for bracing the sides of the protection assembly are only partially shown since a rib cage on the outside of the sheet metal walls thereof is shown more fully in another view.
Figure 3:
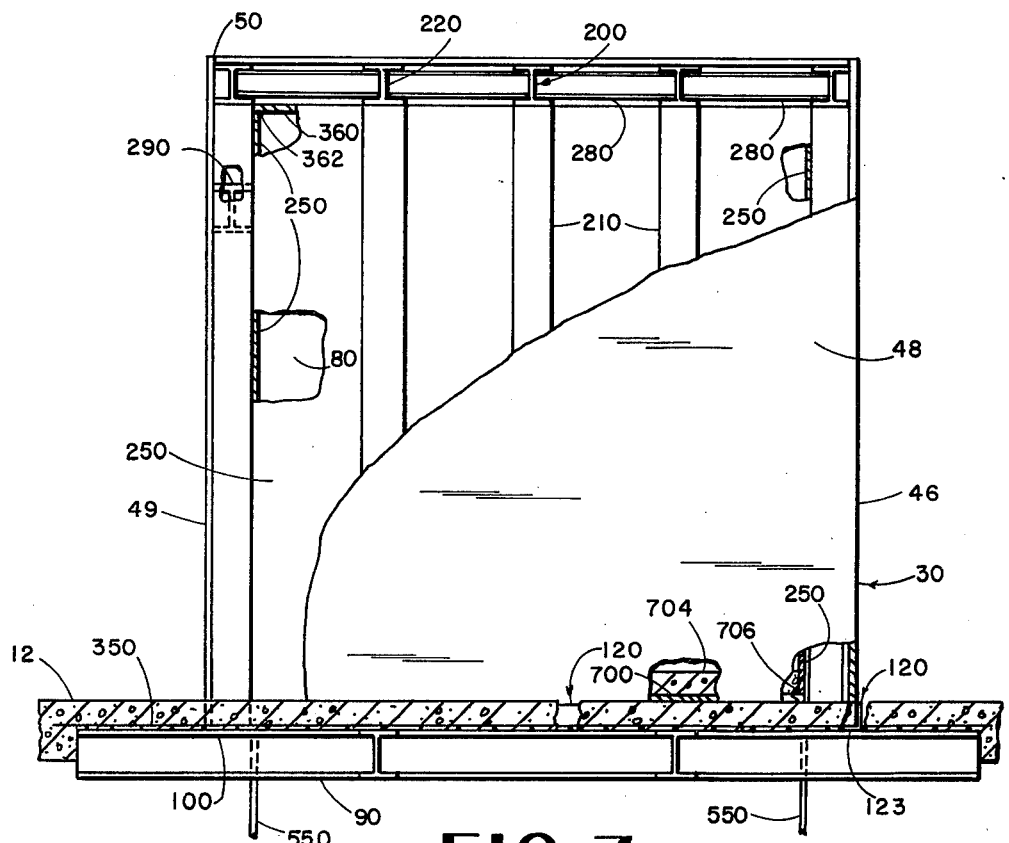
FIG. 3 is a side elevation of a modification of the tornado protection assembly, being substantially the modification of FIG. 1, since the latter has a beam structure on its inner side visible in FIG. 2 where a side wall has been broken away, the protection assembly of FIG. 2 being shown with the anchor beams thereof disposed beneath at least portions of a concrete floor slab and particularly beneath the wire mesh thereof.

In FIG. 1 the tornado protection assembly 30 can be seen to have a tough shell or protection assembly 40, having a top wall 42 and side walls comprising a front wall 44; a left side wall 46; a right side wall 48 and a rear wall 49, the latter two walls being seen in FIG. 3. The front and rear walls are parallel and at a right angle to the side walls, all such walls being vertical and the top wall 42 being horizontal, all walls being secured to any adjacent walls by welding at abutting edges, such welding being seen at 50.

The top wall 42 can have an opening 56 through it so that a toilet vent pipe can extend out therethrough through the roof of a building. The top wall 42 or any of the walls have one or more electrical wiring openings 60 therethrough, such as the one shown in the middle of the top wall 42 in FIG. 1 so that electrical power can be brought in to the interior of the shell. A toilet seat 70 and flush tank 72 can be seen in FIG. 1 to identify that the shell 30 can enclose a bathroom 80.

Beneath the shell 30 is a anchor assembly 90 comprising anchor beams 92 extending from right to left and another anchor beam 94 can extend from forward to rearward under the center of the shell, the anchor beam 94 actually having a plurality of sections 95 disposed one on each side of each of the right to left anchor beams 92.

It is understood that the anchor assembly 90 can be of other construction than this in the number of beams and arrangement, but the important factor is that the anchor assembly 90 is disposed beneath the shell 30, and is rigidly fixed thereto such as by welding wherever one of the portions of the anchor assembly passes under the edge of any one of the vertical walls of the shell 30, or, in other words, at different places 100.

To further facilitate the attachment of the beams 92 and 95 to the shell 30, the shell can be provided with angle iron extending downwardly on the outside of the shell from a place a few inches above the bottom of each outer wall of the vertical walls, whereby four angle iron pieces are employed, one along each of the vertical walls of the shell 30, such angle irons being seen at 120 in FIG. 1, and having vertical flanges 122, but also having horizontal flanges 12, which latter extend under the respective vertical wall and horizontally inwardly under the shell 30 so that the welding of the anchor assembly members 92 and 95 can be to the horizontal flanges 123 of the angle irons 120, under which latter the anchor assembly beams 92 and 95 extend, and the attachment of the angle iron members 120 to the vertical walls of the shell 30 can be done in any suitable manner, one method being by having welding at 140 extending continuously along the top of any one of the angle iron members 120 and attaching it to its respective vertical wall of the shell 30.

Figure 4:
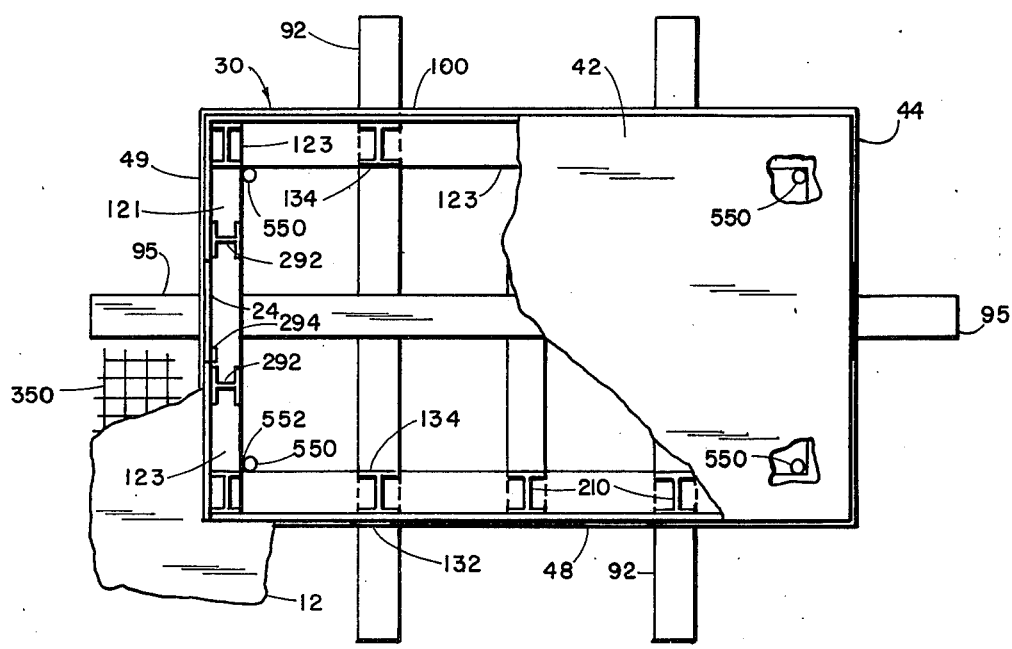
FIG. 4 is a top plan view of the protection assembly of FIG. 2 with a portion of the top being broken away to show the bracing beam structure under its steel shell, portions of the concrete in which the anchor section of the protection assembly is anchored are shown including a part of the wire mesh.

The welding attaching and angle iron member to the adjacent part of a beam 92 or 95 can be at the places shown at 132, although it could also be in addition at places shown at 134 in FIG. 4 for additionally strong attachment.

The side walls and roof of the shell 30 can be made of steel plate so strong as to be itself strong enough to withstand the majority of the forces experienced by buildings in areas while tornadoes are passing through, or else it can be reinforced by a reinforcing frame work structure, generally indicated at 200 in FIG. 3, and comprising horizontally spaced vertical bracing beams 210, extending from top to bottom along each of the side walls of the shell 30 and having above each one a horizontal ceiling brace or brace beam 220, whereby one of each of the braces 220 extend from right to left across the top of respective ones of aligned right and left beams 210.

An inner wall covering, shown at 250 in FIG. 3, can extend along the inner sides of the vertical bracing beams 210 for forming a wall for the bathroom or other room that is protected herewith. In FIG. 3, at 280, can be seen certain horizontally extending beams which interconnect each adjacent pair of the horizontally extending braces 220, the beams 280 being welded to the braces 200, respectively, whereever they abut.

Above the doorway 24 is a horizontal beam 290 welded to adjacent ones of the vertical bracing beams 210. This construction and the entire I-beam bracing structure can be seen in FIG. 9 as an interconnected unit although the lower ends of the vertical brace beams 210 are attached to the angle iron horizontal bottom braces 120, the adjacent portions of the shell 30 being used as part of the attachment, the remainder of the attachment being welding, all as described above.

In FIG. 4 end beams 292 are shown which are disposed one on each side of the door 24 and the door is hinged in any suitable manner, such as shown at 294 in FIG. 4.

In FIG. 3 wire mesh can be seen at 350 embedded in the concrete of the floor slab 12, and the mesh 350 is disposed above the anchor assembly 90, so that in order for a tornado to lift the anchor assembly 90 it must pull up a great section of the floor 12, which is further strengthened by the position of the wire mesh 350.

The floor slab 12 can extend completely down below the anchor assembly 90 as shown in FIG. 1, or it can extend less than completely as seen in FIG. 3.

Referring now to the modification of FIG. 5, the modified tornado protection assembly is there shown at 400, having a tough shell 404 of the same description as the shell 30 of the modification of FIG. 1.

In FIG. 5 the method of bracing is different than in FIG. 1 and the bracing structure, generally indicated at 400, comprises anchor members 410 extending horizontally outwardly from the shell 404 on right and left sides thereof. Inner ends of the horizontal anchor members 410 are welded at 424 to upwardly extending brace beams 422 which extend vertically upwardly alongside of the adjacent walls of the shell 404, and are welded at 423 where they abut at their upper ends a horizontal top beam 424 which extends across the top of the shell 404 horizontally. Welding at 425 holds the beams 422 and 424 to the shell, the welding 425 being attached to the shell and to the respective beams 422 or 424 either continuously along the length of the beams or can be spot welded in spaced positions.

The anchor beams 410 are embedded in the concrete 12 as seen in FIG. 5.

Cross beams 450 extend horizontally outwardly from the top beam 424 and are spaced apart along the length of the top beam 424 and are welded to the top beam 424 at 452, and are likewise welded to the top of the shell 404 wherever desirable either at spaced points or entirely along the beams 450, and so the welding can be considered to be indicated by the numeral 462 at various places.

The corners of the shell 404 are strengthened by angle iron reinforcers 460, which are welded on their edges to the walls of the shell 404 to which they are adjacent, each angle iron 460 being disposed across the corner of the shell 404 and being spaced vertically one above the other, as seen in FIG. 7.

In FIG. 6, the top 463 of the shell 404 is broken away, whereby the shell 404 is shown in section.

In FIG. 8 the shell 30 of FIG. 1 is shown and a vertical beam 210 is shown alongside it and studs 520 made of wood such as 2×4 wooden studs extend away from the shell 30, whereby an inner wall 522 can be attached to the wooden studs 520, as might be preferred by some builders. FIG. 8 can also represent a way in which a beam on the exterior of a shell, such as the beam 422 of the modification of FIG. 5, can have studs alongside it to receive a wall, although the wall in that case would be the wall of an adjacent room, rather than the wall of the room which the shell is protecting.

As thus described it will be seen that this invention has more than one modification of ways in which to construct a protective tornado assembly which can withstand the forces of a tornado against its walls from all directions.

In FIG. 1 at 550' are sample wooden 2×4 vertical wall studs which illustrate that the outer side of the shell 30 can be covered with studding to form support for wall surfaces for rooms adjacent to the bathroom 80.

It is desired that the entire protection assembly including its shell 30 and its brace structure be made from iron or steel, although it is recognized that other materials could be made of dimensions such as to be equally as strong.

In FIG. 3 an anchor assembly 90 projects below the concrete floor slab, but it could also be completely embedded in the floor slab as it is in the anchor members 410 of the modification in FIG. 5.

Referring now to FIG. 3, there is a place on the left hand side thereof when the inner wall covering 250 that is on the wall closest to the viewer is broken away for revealing the wall covering 250 that is on the wall which is closest to the side 49 of the enclosure, the latter wall being shown in cross-section. Also an upper wall covering 360 is shown extending across the ceiling so as to finish out the interior of the enclosure with flat surfaces so as to be conventional in the way rooms generally are. These wall coverings 250 and 360 can be either wall board or panelling, or they can be sheet metal. When of sheet metal they can be of substantial thickness such as one quarter of an inch or more so as to give strength and can even be used as a substitute for having the shell 30 on the outside of the I-beam frame work structure, generally indicated at 200, and diagrammed in FIG. 9. In other words, the wall covering shown at 250 and 360 in FIG. 3, representing wall covering material which covers the side walls and the ceiling, can be of strong metal and be themselves and be themselves a "shell" substituting for the shell 30. When the latter structure is used welding would be placed at 362 extending around and interconnecting all of the edges of the ceiling metal 360 with the wall covering to form a shell.

Referring to FIG. 10, the structure could then be such that at the bottom each vertical bracing beam 210, a sample of which is shown at 210 in FIG. 10, the bracing beam can be covered on its inner side with a metal plate 250 to form a shell on the inner side, and an angle iron 531 can be disposed with a horizontal flange extending under the respective bracing beams 210 along one side of the enclosure with a vertical flange of the angle iron 531 disposed on the inner side of the enclosure and on the inner side of the steel plate shell wall covering 250, and welded thereto along the top of the angle iron 351, as seen at 354, the angle iron itself being attached to the anchor beam 92 by welding 538 extending all along the angle iron 531 wherever it is above an anchor assembly member 92. Other welding at 536 can connect the respective beams 210 with the horizontal flange of the angle iron 531 and also connect the horizontal flange with the angle iron 531 with the adjacent portions of which ever anchor assembly member or beam 92 is disposed there beneath for making a strong construction.

It is understood that the angle assembly member 531 in FIG. 10 is to be thought of as representing one of four such angle iron members 531 arranged in a square and being the equivalent of the angle iron members 120 which are also arranged in a square in FIG. 3 modification.

Referring now to FIGS. 3 and 4, certain grounding rods are shown at 550 which are welded at 552, each to lower parts of the protection assembly which are metallic such as to the vertical bracing beams 210 if they are exposed, or else to the inner side of the inner wall covering 250 if the same is made of steel.

The grounding rods 550 extend down into the earth and since they are attached to metallic frame work and parts of the protection assembly any lightening that would reach the top of the sides of the assembly would tend to be conducted harmlessly down into the earth.

Referring now to FIG. 3, it will be seen that an earthquake safety weight support steel horizontal member or support 700 is there shown which is welded at 706 to whatever metallic parts of the protection assembly are closest on all four sides of the generally horizontally extending earthquake weight support member 700, the welding being at 706 for example for connecting the support 700 to sheet steel inner wall 250.

Above the earthquake weight support 700 is an earthquake safety weight 704 which can be of a cast concrete slab about four inches thick and designed by its weight to hold down upon the support 700 for giving the entire protection assembly a great stability and safety in the event of an earthquake.

As best seen in FIGS. 1, 3 and 4, it can be said that at least nine-tenths of the area of each of the side walls is covered by material capable of substantial resistance to penetration by heavy tornado thrown debris and specifically by a sheet metal material, still more specifically by sheet steel which is well known to be substantially stronger than glass, such as the glass of the windows of the house of FIG. 2, which can be easily penetrated by heavy tornado thrown debris.

The interior room or tornado room protection space 20 is preferably an interior room of the building because such a room does not require windows which would be easily broken. The tornado protection space 20 can be thought of as occupied by at least one of the rooms of a house or building and by less than all of the rooms of the building, thereby defining a tornado space 20 which is of a lesser cost by far than would be the case if the entire building were similiarly protected.

One of the walls of the shell 30, which can be the top wall 42 thereof, is provided with the opening 56, through which a toilet vent pipe can extend and a toilet vent pipe is shown in FIG. 1 at 800, partially in full and partially in dotted lines.

It can be seen that the majority of the areas of at least two adjacent ones of the side walls 44, 46, 48 and 49 are disposed at a right angle to each other, as is incidental to the entire shell 40 being substantially of block shape, rectangular on each of its side walls, its top wall 42 and also on its bottom or floor.

I claim:

1. A tornado protection building comprising an enclosure having a top and four side walls, each of said walls having an imaginary outer plane touching outermost portions of the respective side wall and another imaginary inner plane touching innermost portions of the same respective side wall, said inner and outer planes being at least one inch in thickness so as to provide each respective wall with substantial resistance to forces that might be exerted onto each wall in all directions by a tornado whereby the resistance of each said wall to forces in all directions on it is in substantially all parts of said wall, each of said side walls being adjacent two others of said side walls and said top wall having edges respectively adjacent each of said side walls, means securing said walls of said enclosure each to said respective adjacent walls of said enclosures to give said enclosure rigidity, anchor members attached to lower ends of said sidewalls, said building having a plurality of rooms, said tornado protection enclosure being attached to said building in a manner such that said protection enclosure extends across the top and sides of a space occupied by at least one of said rooms and less than all of the rooms of said building thereby defining a tornado protection space, said tornado protection space being on the first floor above the general ground level surrounding said building, said building having a horizontal concrete slab under it, said anchor members being disposed beneath at least a substantial portion of said concrete slab, the majority of the areas of at least two adjacent ones of said side walls being disposed substantially at a right angle to each other.

2. The tornado protection enclosure of claim 1 in which said enclosure has horizontally extending earthquake safety weight support means disposed extending generally horizontally between side walls thereof in lower parts of said side walls, and an earthquake safety weight means disposed above and supported by said safety weight support means so that said safety weight means tends to hold said protection enclosure in a more safe condition during an earthquake.

3. The tornado protection building of claim 1, said tornado protection space having a toilet seat system to which a flush tank is connected, said toilet seat system having a toilet vent pipe extending out through said enclosure whereby said tornado protection space can be used as the toilet room of said building not only during long tornado watch vigils but also during times of ordinary living for providing said protection space with a double use benefit.

4. The tornado protection building of claim 1, having at least 9/10ths of the area of each of said side walls being covered by material substantially stronger than glass and capable of substantial resistance to penetration by tornado thrown debris.

5. The tornado protection building of claim 1 having one of said sidewalls having a doorway opening therethrough, and a door in said doorway opening mounted on said sidewall having said doorway opening, said door being substantially covered with sheet metal.

6. The tornado protection building of claim 1 having two adjacent ones of said sidewalls each having the majority of its area covered with pieces of flat sheet metal, said pieces of flat sheet metal of said two adjacent sidewalls being disposed at a right angle to each other.

7. The tornado protection building of claim 1 having the majority of the areas of said two adjacent ones of said sidewalls being covered by flat sheet metal.

8. The tornado protection building of claim 1 having vertical and horizontal bracing means extending on one side of and attached to each of said walls.

9. The tornado protection building of claim 1 having said anchor members being rigid and extending generally horizontally outwardly from lower portions of said sidewalls.

10. The tornado protection building of claim 1 having said anchor members comprising anchor beams extending generally horizontally under said side walls, angle iron members under each of said side walls and having vertical flanges alongside said side walls respectively and secured thereto, said angle iron members having horizontal flanges above and secured to respective ones of said anchor means beams.

11. The tornado protection building of claim 1 in which said enclosure has a sheet metal top wall section attached thereto and serving as a lightning attractor, grounding means extended down into the ground beneath said building, electrically conductive means electrically connecting said grounding means and said top wall for delivering electrical charges from lightning harmlessly to the ground.

12. The tornado protection building of claim 1 in which said building is of the basementless type.

* * * * *